United States Patent
Wu et al.

(10) Patent No.: US 12,467,987 B2
(45) Date of Patent: Nov. 11, 2025

(54) MAGNETOMETER WITH RESPONSIVE MATERIAL

(71) Applicant: Honeywell International Inc., Charlotte, NC (US)

(72) Inventors: Jianfeng Wu, Tucson, AZ (US); Mary Salit, Plymouth, MN (US); Neal Eldrich Solmeyer, Edina, MN (US); Matthew Wade Puckett, Phoenix, AZ (US); Matthew Robbins, Minneapolis, MN (US)

(73) Assignee: Honeywell International Inc., Charlotte, NC (US)

( * ) Notice: Subject to any disclaimer, the term of this patent is extended or adjusted under 35 U.S.C. 154(b) by 463 days.

(21) Appl. No.: 18/172,603

(22) Filed: Feb. 22, 2023

(65) Prior Publication Data
US 2025/0306135 A1 Oct. 2, 2025

(51) Int. Cl.
*G01R 33/032* (2006.01)
*G01R 33/00* (2006.01)
*G01R 33/26* (2006.01)
*G02B 6/293* (2006.01)

(52) U.S. Cl.
CPC ....... *G01R 33/032* (2013.01); *G01R 33/0017* (2013.01); *G01R 33/26* (2013.01); *G02B 6/29343* (2013.01)

(58) Field of Classification Search
CPC .. G01R 33/032; G01R 33/0017; G01R 33/26; G02B 6/29343
See application file for complete search history.

(56) References Cited

U.S. PATENT DOCUMENTS

| | | | |
|---|---|---|---|
| 10,082,545 B2 | 9/2018 | Jeske et al. | |
| 11,079,233 B2 | 8/2021 | Wu et al. | |
| 11,119,163 B2 | 9/2021 | Puckett et al. | |
| 11,131,619 B2 | 9/2021 | Ozdemir et al. | |
| 11,199,733 B2 | 12/2021 | Puckett et al. | |
| 11,300,639 B2 | 4/2022 | Solmeyer et al. | |
| 2016/0356863 A1 | 12/2016 | Boesch et al. | |
| 2017/0125911 A1* | 5/2017 | Alu | H04R 23/00 |
| 2018/0136291 A1 | 5/2018 | Pham et al. | |
| 2020/0012008 A1* | 1/2020 | Chen | G01L 9/14 |

(Continued)

FOREIGN PATENT DOCUMENTS

EP 3480614 A1 5/2019

*Primary Examiner* — Alvaro E Fortich
(74) *Attorney, Agent, or Firm* — Fogg & Powers LLC (57) ABSTRACT

A magnetometer with responsive material is provided that includes a PT symmetric assembly. The PT symmetric assembly includes gain material and responsive material that are positioned to achieve PT symmetry. The responsive material is configured to shift a resonance frequency of point defects in response to a magnetic field. A microwave antenna is configured to generate a microwave field of varying frequencies that engage the responsive material. A controller is configured to adjust a tunable laser source that is input into the PT symmetric assembly based on an output of the PT symmetric assembly to cause a gain generated by the gain material to match a loss caused by the responsive material. The controller is further configured to determine a strength of the magnetic field by determining one of a deviation from the exceptional point and an amplitude of the gain needed to reach the exceptional point.

20 Claims, 9 Drawing Sheets

(56) References Cited

U.S. PATENT DOCUMENTS

2020/0257946 A1* 8/2020 Kananian ............... G06K 19/00
2021/0180953 A1* 6/2021 Wu ...................... G01C 19/661
2022/0050043 A1* 2/2022 Ozdemir ............ G01N 15/1456

* cited by examiner

MAGNETOMETER WITH RESPONSIVE MATERIAL

STATEMENT REGARDING FEDERALLY SPONSORED RESEARCH OR DEVELOPMENT

This invention was made with Government support under FA8650-20-C-7034 awarded by Air Force Research Laboratory-Wright Research. The Government has certain rights in the invention.

BACKGROUND

The precise measurement of a magnetic field, especially vector magnetic field information, is critical for many applications, including magnetic anomaly-based navigation and dipole beacon-based navigation. These types of applications require magnetometers with high sensitivity, low size, weight, and power (SWaP) as well as the ability to operate in the earth's magnetic field.

Current technologies that are capable of providing high sensitivity (less than 1 pT is required in many applications) include a superconducting quantum interference device (SQUID). A SQUID requires cryogenic refrigeration. A SQUID is a bulky and power-hungry system that makes it less than ideal for many applications. Another system that is capable of providing a high sensitivity level is an atomic-based magnetometer. However, atomic-based magnetometers suffer from "dead spots" in the earth's magnetic field. Magnetometers based on integrated photonics show promise because they have a low SWaP and better spatial resolution than conventional sensors. However, current magnetometers based on integrated photonics do not provide the level of sensitivities needed for many applications.

For the reasons stated above and for other reasons stated below which will become apparent to those skilled in the art upon reading and understanding the present specification, there is a need in the art for a magnetometer with a desired SWaP that provides high sensitivity.

SUMMARY

The following summary is made by way of example and not by way of limitation. It is merely provided to aid the reader in understanding some of the aspects of the subject matter described. Embodiments provide a magnetometer that includes a system with gain material and responsive material positioned such that the system is described by Hamilton which obeys parity-time symmetry while being non-Hermitian (any optical system with gain or loss can have this property). Absorption within the responsive material due to a magnetic field is measured near an exceptional point in embodiments to provides enhanced sensitivity.

In one embodiment, a magnetometer with responsive material is provided. The magnetometer includes a tunable laser source, a PT symmetric assembly, at least one sensor, a microwave generator, a microwave antenna, and a controller. The PT symmetric assembly in communication with an output of the tunable laser source, the PT symmetric assembly including gain material and responsive material positioned to achieve PT symmetry. The responsive material is configured to shift a resonance frequency of point defects in response to a magnetic field. The at least one sensor is used to generate sensor information. The at least one sensor is in communication with an output of the PT symmetric assembly. The microwave signal generator is used to generate microwave signals of varying frequencies. The microwave antenna is configured to generate a microwave field that engages the responsive material. The microwave field increases population of the point defects in a state which allows the responsive material to absorb at least at least some energy at the shifted resonant frequency. The controller is in communication with the at least one sensor and the tunable laser. The controller is configured to adjust the laser source based on the sensor information to cause gain generated by the gain material to match a loss caused by the responsive material to reach an exceptional point. The controller is further configured to determine a strength of the magnetic field by determining one of a deviation from the exceptional point and an amplitude of the gain needed to reach the exceptional point.

In another example, a method of operating a magnetometer with responsive material is provided. The method includes monitoring resonant frequencies in an output of a ring resonator assembly of the magnetometer, the ring resonator assembly including gain material and the responsive material that are positioned to achieve a parity-time symmetric ring resonator assembly, the responsive material being configured to shift a resonance frequency of point defects in response to a magnetic field; determining if a gain provided by gain material matches a loss caused by the responsive material based on the monitored resonant frequencies; and determining a strength of a magnetic field when the gain provided by the gain material does not match a loss provided by the responsive material.

In still another embodiment, a method of creating a magnetometer with responsive material is provided. The method including forming a parity-time (PT) symmetry assembly where a first portion of the PT symmetric assembly is configured to amplify light wave energy received from a tunable laser source with gain material and a second portion of the PT symmetric assembly is configured to dissipate the light wave energy with responsive material, wherein the responsive material configured to shift a resonance frequency of point defects in response to a magnetic field; positioning a microwave antenna that generates a microwave field to engage the responsive material, the microwave field increasing a population of the point defects in the responsive material in a state which allows the responsive material to absorb at least some energy at the shifted resonant frequency; configuring a controller to control an output of the tunable laser source to match the gain provided by the gain material with a loss provided by the responsive material; and configuring the controller to determine a strength of a magnetic field based on a resonant frequency splitting in an output of the PT symmetric assembly.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments of the present invention provide a magnetometer that includes responsive material that is responsive to magnetic field changes in a "parity-time symmetric assembly" that may be formed in part with integrated photonics. In one example, the responsive material is nitrogen-vacancy (NV) diamond material, and the magnetometer is a vector magnetometer that is based on the NV diamond absorption under a magnetic field. Further, embodiments may use a ring resonator configuration to create the parity-time symmetric assembly. The parity-time symmetric assembly is operated near an exceptional point to provides enhanced sensitivity.

Throughout this document "PT symmetric assembly" or "PT symmetry assembly" means an optical assembly which features optical gain and/or optical loss, which implies that the Hamiltonian for the system is non-Hermitian but still preserves parity-time symmetry, and which also implies that the system can be operated at one or more "exceptional points" at which its behavior changes dramatically as a result of small changes in its operating condition.

Figure 1:
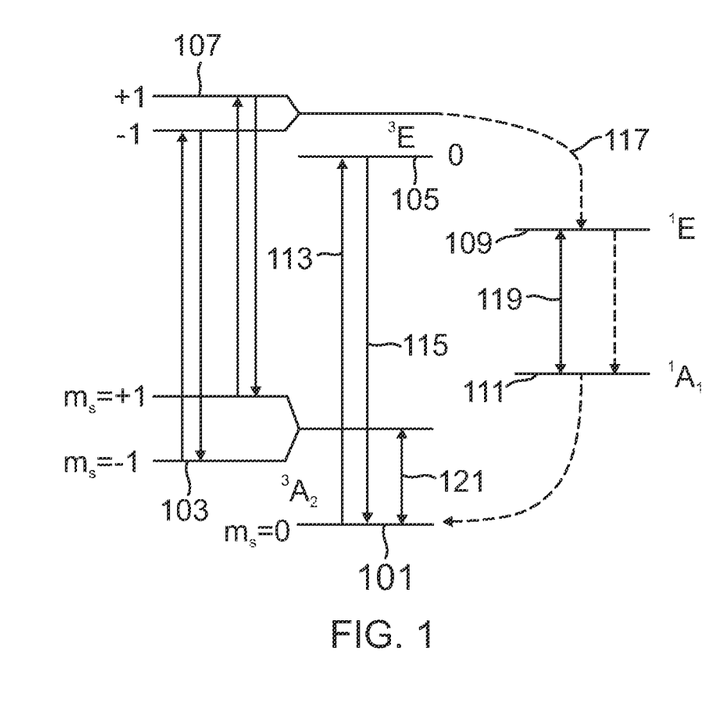
FIG. 1 illustrates a transition diagram of various states in responsive material that is sensitive to a magnetic field.

Referring to FIG. 1, a transition diagram that illustrates transitions between the various states in responsive material that is sensitive to magnetic field is provided. As discussed above, certain materials, such as NV diamond, may have certain physical characteristics that allow the material to be responsive to a magnetic field. As used herein, NV diamond may refer to a diamond material having multiple point defects, where a point defect is a nearest-neighbor pair of a nitrogen atom substituted for a carbon atom and a lattice vacancy. Other types of material that is sensitive to magnetic fields may be used such as, but not limited to, silicon carbide.

As illustrated in FIG. 1, exemplary responsive material that responds to magnetic fields may have a ground state that is a spin-triplet state. In particular, a spin-triplet ground state may have three spin projections: a ground antiparallel spin 101 of spin projection 0 and two ground parallel spins 103 with spin projections of +/−1. The ground antiparallel spin 101 and the ground parallel spins 103 are separated by a resonant frequency 121. For example, in the absence of a magnetic field, when the responsive material is NV diamond, the resonant frequency 121 may equal 2.87 GHz. Additionally, point defects within the responsive material may be optically excited through spin-conserving transitions 113 to a spin-triplet excited level. The spin-triplet excited level also has multiple spin projections: an excited antiparallel spin 105 of spin projection 0 and excited parallel spins 107 with spin projections of +/−1. The point defects of the responsive material become optically excited by exposure to pump light having a particular frequency. For example, in NV diamond, laser light having a wavelength of 532 nm may cause spin-conserving transitions from the ground triplet states to the excited triplet states.

When point defects within the responsive material are in an excited state, the defects may relax either through a radiative transition 115 or through an intersystem crossing 117. When point defects relax through a radiative transition 115, the point defect may fluoresce and return to one of the ground triplet states. For example, an NV diamond point defect fluoresces by emitting light with a wavelength of 637 nm during a radiative transition 115. Conversely, when point defects relax through an intersystem crossing 117, the point defects do not fluoresce and transition to a shelved state. A shelved state may be a shelved ground state 111 or a shelved excited state 109. Additionally, when point defects are in one of the shelved states 109 and 111, the point defects may absorb energy from laser light at a particular frequency. For example, NV diamond point defects in one of the shelved states 109 and 111 may absorb energy laser light having a wavelength of 1042 nm and transition 119 between states 111 and 109.

In certain embodiments, applying a microwave frequency signal to the responsive material that is responsive to magnetic field changes increases the rate of intersystem crossings 117 compared to radiative transition 115. In the responsive material, non-radiative intersystem crossings 117 may be strongly spin selective. For example, point defects having a parallel spin 107 are more likely to experience an intersystem crossing 117 to one of the shelved states 109 and 111. In contrast, point defects having the excited antiparallel spin 105 are more likely to experience a radiative transition back to the ground triplet state. Applying a microwave frequency signal to the responsive material at a resonant frequency 121 increases the probability that the point defects are in the $m_s=+1$ state of the ground parallel spin 103 manifold. Then, when optically pumped into the excited parallel spin 107 state, the spin is preserved, and the $m_s=+1$ state of the excited parallel spin 107 manifold has a higher probability of making the intersystem crossing 117 than the $m_s=-1$ does. For example, the resonant frequency 121 may be 2.87 GHz when the material is NV diamond. Accordingly, applying a radio frequency of 2.87 GHz to the material may increase the probability of intersystem crossings 117 to one of the shelved states 109 and 111.

Additionally, applying a microwave signal at the resonant frequency 121 to the responsive material, increases the population of point defects at the shelved states 109 and 111. Thus, the responsive material is more likely to absorb the light energy from the laser light having a wavelength resonant to the 109 to 111 state transition, at wavelength of 1042 nm in the NV diamond example. Accordingly, when the probe light is applied to the responsive material without the microwave signal at the resonant frequency 121, the responsive material absorbs the energy of the light laser with less frequency. For example, applying a microwave signal having a resonant frequency 121 of 2.87 GHz to NV diamond material causes the NV diamond material to absorb the energy of the laser light having the wavelength of 1042 nm at an increased rate.

Further, the resonant frequency 121 for the responsive material may change in the presence of a magnetic field. For example, when the responsive material is exposed to a magnetic field, the Zeeman effect may cause the resonant frequency 121 to experience a shift in proportion to the strength of the experienced magnetic field. In particular, in the presence of a magnetic field, the resonant frequency 121 may split into two different resonant frequencies 121, where the difference between the two resonant frequencies 121 is proportional to the experienced magnetic field. Accordingly, some systems may identify the resonant frequency 121 at which point defects absorb energy from probe light from the probe laser to determine the strength of a magnetic field experienced by the material that is responsive to magnetic field changes.

Additionally, the point defects within the material may be in one of several orientations. For example, when the material is NV diamond, each point defect may be in one of four different orientations. Additionally, the material may have many point defects in each of the four orientations. Accordingly, a system may identify vector information for a magnetic field based on electrical signals that detect the laser light applied to the material. For example, when the material is exposed to a magnetic field, the resonant frequencies 121 for a point defect may shift based on the orientation of the point defect in relation to the experienced magnetic field. Thus, when the point defects in the material are in multiple different orientations, the point defects in the material may have separate resonant frequencies associated with each of the different orientations of the point defects. Therefore, vector information for the magnetic field may be determined by identifying which resonant frequencies correspond to the different orientations of the point defects in the material. In some implementations, systems apply biased magnetic fields to the material when determining which resonant frequencies are associated with particular orientations of the point defects.

The magnetometer incorporates laser light to illuminate the point defects within the responsive material such that the point defects move to the excited triplet state in some embodiments. The magnetometer may also include components that generate and expose the material to RF energy in frequencies that include the resonant frequency 121 for the responsive material. As described above, the probability of intersystem crossings 117 to shelved states 109 and 111 increases at the resonant frequency 121. Additionally, the magnetometer may include components that generate and direct the propagation of the probe light to expose the material to the probe light generated by the probe laser. As described above, point defects in the shelved states 109 and 111 may absorb energy the probe light and transition 119 between states 111 and 109. Accordingly, the components associated with the RF energy may sweep the applied microwave signal through a range of frequencies to identify the resonant frequencies 121 associated with the different orientations of the point defects within the material. The magnetometer or connected system may identify the resonant frequencies 121 based on a detected decrease of the intensity of the probe light passing through the responsive material. The intensity of the laser light decreases because the point defects at the shelved state absorb the energy of the probe light. Based on the identified resonant frequencies 121, the magnetometer or connected system may calculate the magnetic field experienced by the responsive material.

Figure 2:
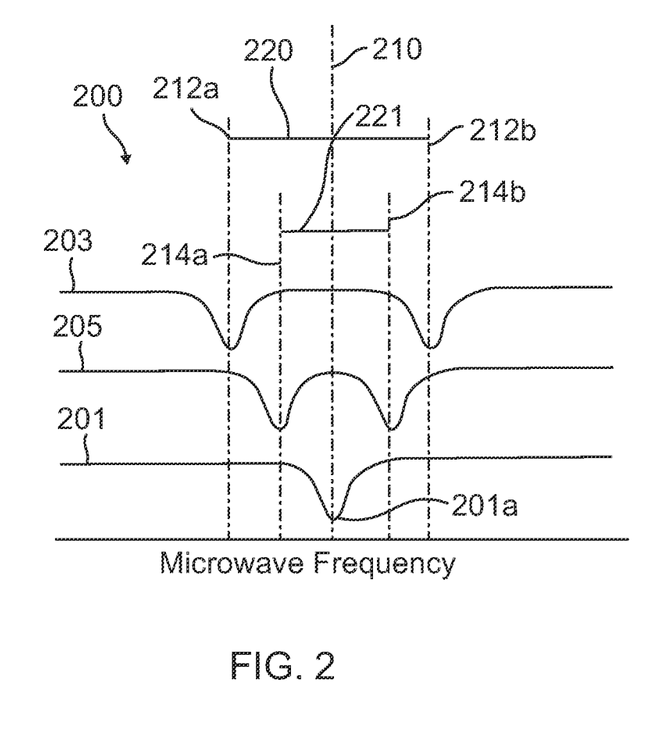
FIG. 2 illustrates a resonant frequency graph due to laser signals passing through the responsive material while an applied microwave field is swept through a range of frequencies.

FIG. 2 is a graph illustrating an example of the detection of a magnetic field based on identifying resonance lines in an applied microwave field that is swept through a range of frequencies. As described above, responsive material is responsive to magnetic field in that a resonance frequency of the responsive material will change due to magnetic field. By exposing the responsive material to varying microwave frequencies (scan with the frequencies), the resonance frequencies can be determined by measuring the probe light output from the responsive material (i.e., at resonance more of the light energy will be absorbed by the responsive material so the intensity of the outputted probe light will decrease). A difference between resonant frequencies is associated with the strength of the magnetic field experienced by the responsive material.

FIG. 2 illustrates a magnetic field strength verses microwave frequency graph 200. Graph illustrates how the strength or intensity of a magnetic field effects the resonant frequency in the responsive material that is responsive to a magnetic field. In this example, plot line 201 indicates when a laser light is introduced into the material in the absence of a magnetic field. In this situation, the responsive material does not experience a Zeeman shift and energy of the laser light is absorbed at a single resonant frequency 201a. This single resonant frequency may be detected, by measuring the laser light at an output of the material. At the resonance frequency, the measured laser light signal strength at the output will be lower because the responsive material absorbs some of the energy of the laser light at resonance. The resonant frequency of when a magnetic field is not present may be used as a base resonant frequency 210.

When the responsive material is exposed to a magnetic field the resonant frequency will change. Plot lines 203 and 205 indicate situations where the material is being exposed to magnetic fields of different strengths. As plot line 203 illustrates, two resonant frequencies 212a and 212b occur in response to this first magnetic field and as plot line 205 illustrates two different resonant frequencies 214a and 214b occur in response to this second magnetic field. As discussed above, a difference 220 and 221 between resonant frequencies 212a and 212b or 214a and 214b is associated with the strength of the magnetic field experienced by the responsive material. In this example, the magnetic field strength experienced by the responsive material associated with the plot line 203 is greater than the magnetic field strength experienced by the material associated with the plot line 205 as evidence by differences 220 and 221. Accordingly, the magnitude of the difference between resonant frequencies is greater when the material is exposed to a greater magnetic field strength. Embodiments identify the resonant frequencies 212a and 212b or 214a and 214b by identifying the frequencies associated with decreases in the intensity of the probe light after passing through the responsive material.

Another aspect of the magnetometer is to create a "parity-time (PT) symmetry assembly." Systems with gain or dissipation are described by non-Hermitian Hamiltonians. A whole class of non-Hermitian Hamiltonians (featuring both gain and loss) can have real eigenvalues (mean they describe real, physically measurable systems) and have the property of being PT-symmetric in the sense that these Hamiltonians commute with the PT operator. The behavior of such systems can be characterized by "exceptional points" at which small changes in the operating conditions (such as the introduction of a magnetic field resulting in a slight increase in optical loss) can have dramatic effects on the output (such as causing the optical loss to be greater than the optical gain, causing the assembly to act as a passive optical resonator rather than a laser.) Optical systems are described herein by non-Hermitian but PT-symmetry-preserving Hamiltonians with exceptional points as PT symmetric assemblies. PT symmetry can be obtained with a pair of coupled systems such as coupled waveguides or coupled resonators. One of the coupled systems dissipates light wave energy while the other of the coupled system amplifies the light wave energy in an equal amount. In examples, coupled cavity resonators are used to create PT symmetry. The point where the dissipation of light wave energy and the amplification of the light wave energy is the same is called the exceptional point. Embodiments operate the magnetometer at or about the exception point.

The below equation describes the resonant frequency of a such a PT symmetric assembly.

$$\omega_{PT_{1,2}}(\delta_\gamma) \cong \omega_0 - j\frac{\gamma_1 + \gamma_2}{2} \pm j\sqrt{|k_{12}|\delta_\gamma}$$

Where $\gamma_1$ and $\gamma_2$ are the gain and loss in the original two resonators. $K_{12}$ is the coupling efficiency between the two resonators. $\delta_\gamma$ is the loss perturbation (change) due to absorption. $\delta_\gamma$ is a negative number, so that $j\sqrt{|k_{12}|\delta_\gamma}$ is a real number. The system is stable, provided $\gamma_1$ plus $\gamma_2$ is greater than zero. At the exception point, one resonant frequency of the system is observed. The exceptional point provides an optimal condition for sensing Eigenfrequency splitting (splitting of the resonant frequency) due to gain/loss perturbations (changes).

Figure 3:
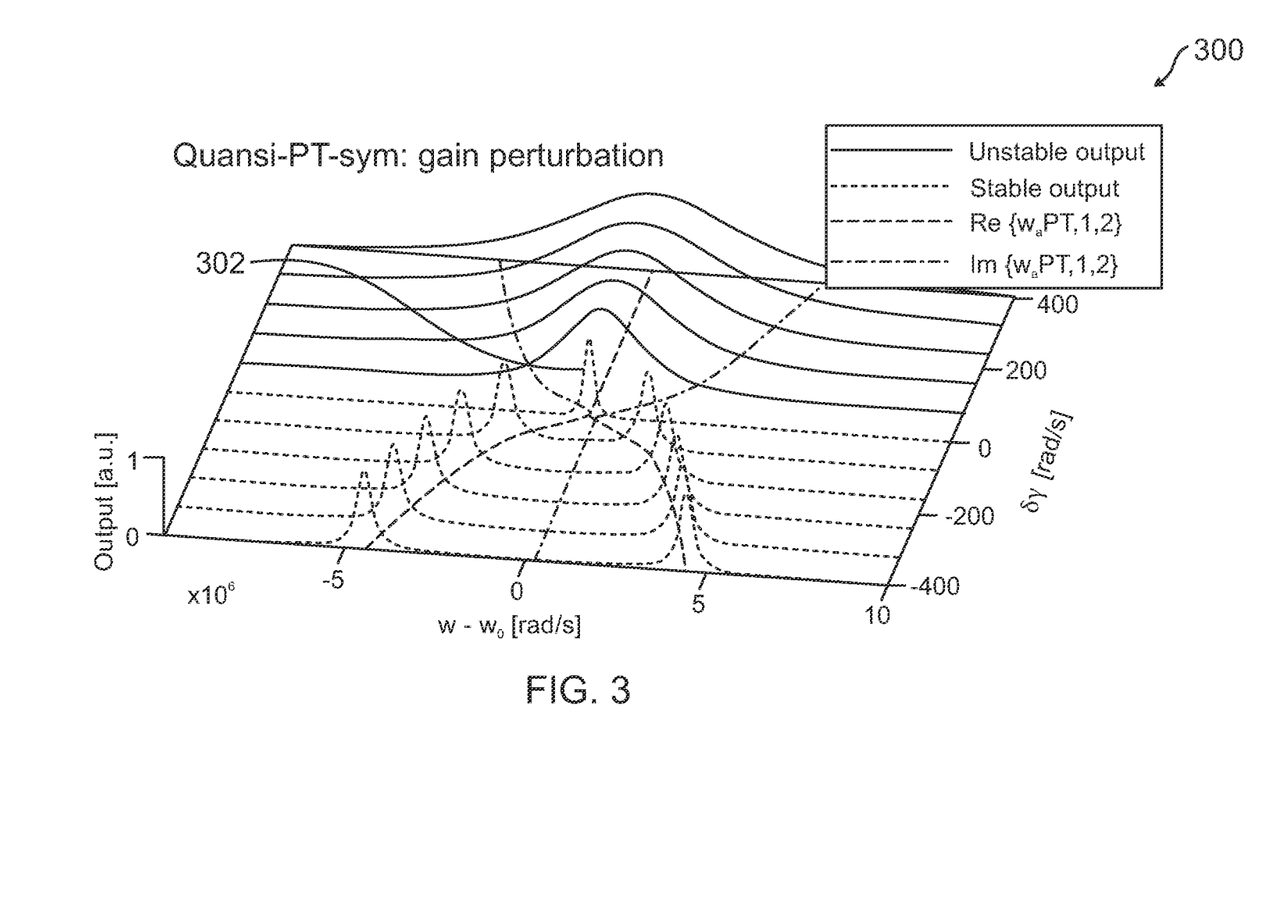
FIG. 3 illustrates a gain perturbation graph that illustrates a resonance frequency verses an external force in a PT symmetry assembly operated at an exceptional point.

Referring to FIG. 3, a gain perturbation graph 300 is illustrated. The gain perturbance graph 300, illustrates a resonance frequency ω verses perturbation $\delta_\gamma$ in a system operated at the exceptional point. As illustrated, when no perturbation $\delta_\gamma$ is present, one resonance frequency 302 is generated. When a perturbation $\delta_\gamma$ is present, Eigenfrequency splitting occurs as illustrated. The frequency split between the frequency peaks (resonances) is proportional to the square root of the gain/loss perturbance. Further, the amplitude of the split between frequencies (amplitude of the frequency split) is proportional to the amount of perturbation $\delta_\gamma$ as illustrated. Embodiments use this relationship to determine the strength of a magnetic field.

Embodiments use the properties in the responsive material in a resonant cavity of a ring resonator assembly to form a small and sensitive magnetometer. Examples of ring resonator assemblies are provided in FIGS. 4 and 5 discussed below.

Figure 4:
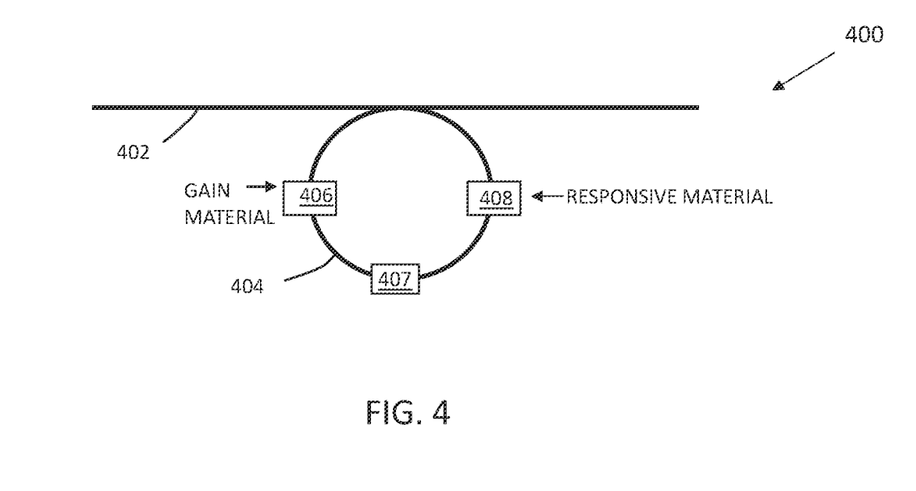
FIG. 4 illustrates a diagram of a ring resonator configuration according to an example aspect of the preset invention.

FIG. 4 illustrate one example of a ring resonator assembly 400 that may be used in a magnetometer that includes responsive material 408. This ring resonator assembly 400 includes a waveguide 502 in which the laser light enters and exits the ring resonator assembly 400. The laser light enters ring 404 from the waveguide 402. On one side of this single ring example includes gain material 406 and on an opposite side of the ring 404 is the responsive material 408 which may be NV diamond material. The positioning of the gain material 406 and the responsive material 408 achieves PT symmetry. To get the ring resonator assembly to operate at the exceptional point, the gain is set match (equal) the loss created by the responsive material 408. The single ring resonator assembly 400 may use a reflector/grating 407 to reflect laser light of a select wavelength within the single ring configuration.

Figure 5:
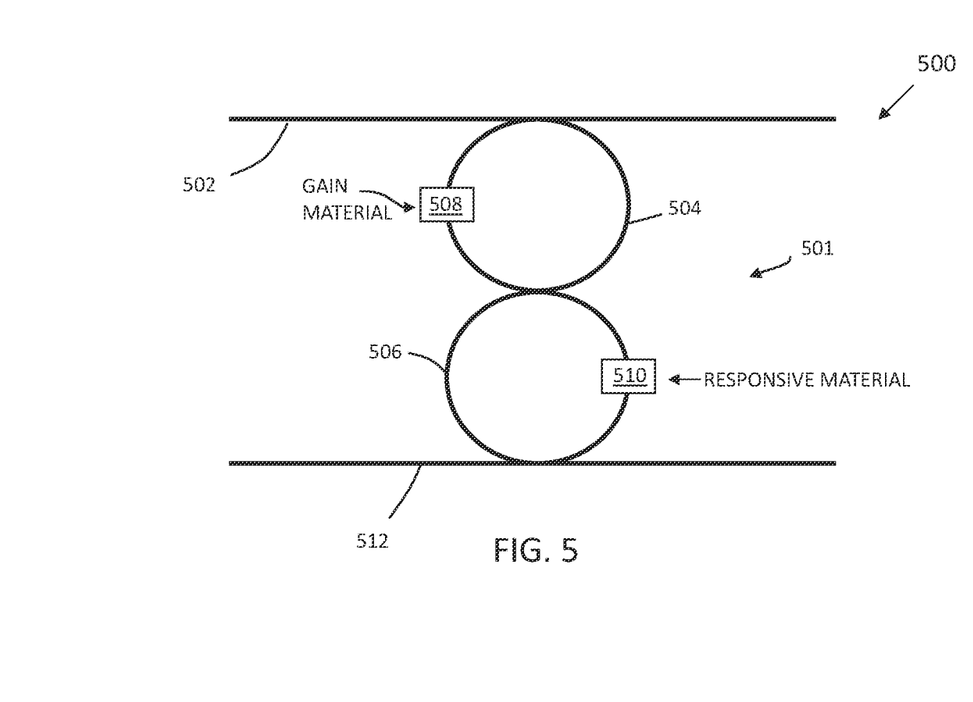
FIG. 5 illustrates another ring resonator configuration according to an example aspect of the preset invention.

A more efficient example of a ring resonator assembly 500 is illustrated in the double ring configuration 501 of FIG. 5. This example includes two waveguides 502 and 512 may be used. One of the waveguides 502 or 512 may be used to direct the laser light to the double ring configuration 501 and the other may be used to output the laser light from the double ring configuration 501.

A first ring 504 of the double ring configuration 501, in this example, includes the gain material 508 and a second ring of the double ring configuration 501 includes the responsive material 510. The double ring configuration 501 provides a non-Hermitian Hamiltonian which has PT symmetry. As with the embodiment discussed above, for the ring resonator assembly 500 to operate at the exceptional point, the gain is set to match the loss created with responsive material 510. In one example, this is achieved by adjusting the power of the tunable laser source 602. In an example, where the power of the tunable laser source 602 is used to adjust the gain, a stimulated Brillion gain or a gain made from rare earth doped material may be used. In another example, a laser pump current is used to adjust the gain. For example, adjusting pump current may be used with a semiconductor optical gain.

Figure 6:
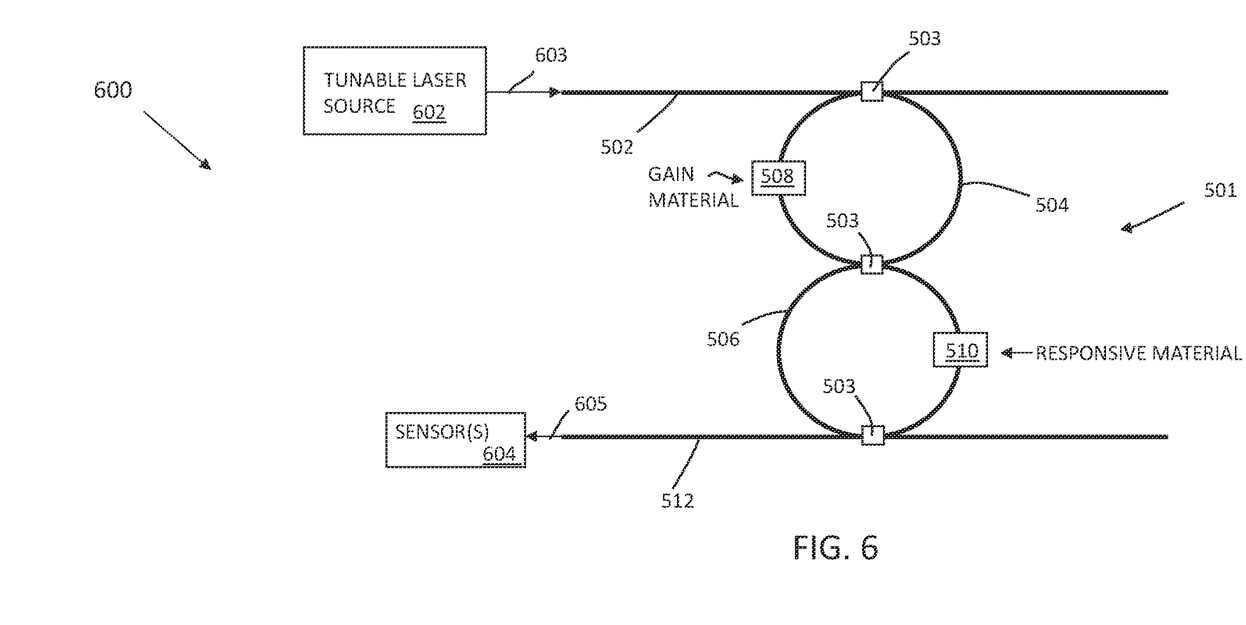
FIG. 6 is a block diagram of a partial magnetometer with responsive material according to an example aspect of the present invention.

A block diagram of a partial magnetometer with responsive material 600 implementing resonator assembly 500 is provided in FIG. 6. As illustrated, a tunable laser source 602 provides input laser light 603 to input waveguide 502. The laser light in the waveguide 502 is directed into the first ring 504 of the double ring resonator configuration 501 that contains the gain material 508. The laser light is then directed into the second ring 506 of the double ring resonator configuration 501 that includes the responsive material 510. The laser light is directed to exit the second ring 506 into an exit waveguide 512. The directing or guiding of the laser light into, through and out of the double ring resonator configuration 501 may be accomplished with resonator mirrors 503 that are partially reflective in an example. At least one sensor 604 is positioned to sense an output laser light 605. The at least one sensor 604 in one example is used to detect the output laser light power. Using the laser light power information at specific microwave frequencies that the responsive material 510 is exposed to, the resonance frequency of the responsive material 510 may be determined. As discussed above, if two resonance frequencies are detected, the difference between the resonance frequencies can be used to determine the strength of an outside force such as a magnetic field. Different integration techniques may be used to determine the gain/loss perturbance.

Figure 7:
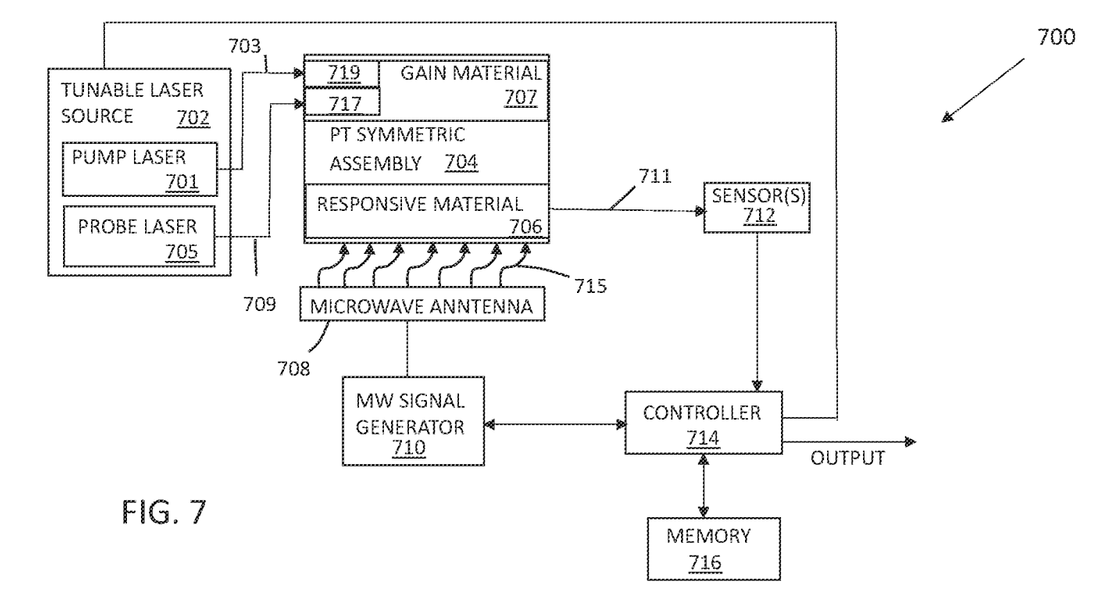
FIG. 7 is a block diagram of a magnetometer with responsive material according to an example aspect of the present invention.

Referring to FIG. 7, a block diagram of a magnetometer 700 with responsive material of an example is illustrated. The magnetometer 700 with responsive material includes a tunable laser source 702 that provides laser light of a select energy to a PT symmetric assembly 704 which may be a ring resonator assembly. Examples of ring resonator assemblies 400 and 500 are discussed above relating to FIGS. 4 and 5.

The tunable laser source 702, in an example, may include a pump laser 701 to generate the pump light 703 and a probe laser to generate the probe light 709. The pump light 703 has a select wavelength that optically excites point defects in the responsive material 706. The probe laser 705 generates probe light 709 of a select wavelength that is absorbed by the point defects in a shelved state in the responsive material 706.

The PT symmetric assembly 704 includes gain material 707 and the responsive material 706. In one example, the gain material 707 includes a first gain material 719 to provide a gain for the pump light 703 and a second gain material 717 to provide gain for the probe light 709.

A varying microwave field 715 that engages the responsive material 706 is provided by a microwave antenna 708 to increase the population of point defects at the shelved states. A microwave (MW) signal generator 710, that generates the microwave field 715, is in operational communication with the microwave antenna 708.

At least one sensor 712 is positioned to receive a laser light output 711 from the PT symmetric assembly 704. The at least one sensor is used to measure the laser light after it passes through the responsive material 706 and out of the PT symmetric assembly 704. In one example, the at least one sensor 712 is a photo diode. In another example, the sensor 712 may be an oscilloscope.

A controller 714 is in communication with the at least one sensor 712. The controller 714 is further in communication with a memory 716 that stores at least operating instructions implemented by the controller 714 and sensed data from the at least one sensor 712. The controller 714, in an example, may be configured to control the tunable laser source 702 and microwave signal generator based on at least an output of the sensor 712. The controller 714 is further configured to generate an output of the magnetometer 700 with responsive material that indicates the strength of a magnetic field based on the sensor data.

In one example, the responsive material 706 is NV diamond material. In this example, the wavelength of the pump light 703 generated by the pump laser 701 of the tunable laser source 702 is approximately at a 532 nm and the wavelength of the probe light 709 generated by the probe laser 705 of the tunable laser source 702 is approximately 1042 nm. Further, the microwave field 715 may be varied around 2.8 GHz. The excited NV diamond material absorbs light near the 1042 nm wavelength under a magnetic field. The NV diamond material is placed near the ring resonator as illustrates in FIG. 7. An evanescent wave of the PT symmetric assembly 704 can sense the absorption change of the NV diamond due to the magnetic field.

Figure 8:
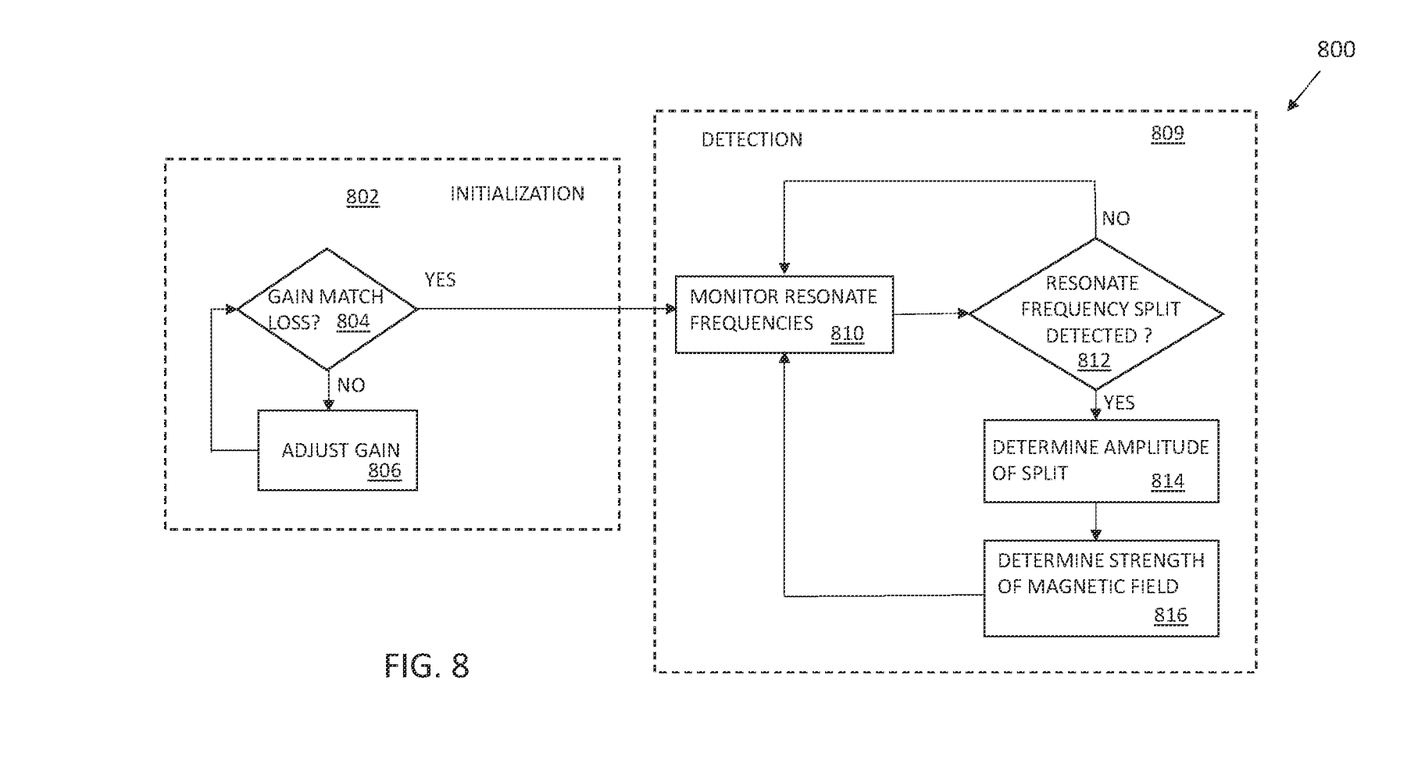
FIG. 8 illustrates an operation flow diagram of a magnetometer with responsive material according to an example aspect of the present invention.

An operation flow diagram 800 that illustrates an example of operating a magnetometer 700 with responsive material is provided in FIG. 8. FIG. 8 is provided as a series of sequential blocks. The sequence of blocks may occur in a different order or even in parallel in other embodiments. Hence the invention is not limited to the sequential sequence of blocks set out in FIG. 8.

As illustrated in FIG. 8, operation flow diagram 800 is separated into an initialization portion 802 and a detection portion 809 in this example. During initialization, the magnetometer 700 with responsive material is not exposed to a microwave field so that the microwave field does not modify the absorption. In the initialization portion 802, the initialization process starts at block 804 where it is determined if the gain matches the loss without the microwave field present. In one example, this is done by detecting only one resonant frequency in an output of the magnetometer 700 with responsive material in response to laser light generated by the tunable laser source 702.

If it is determined at block 804, the (unsaturated) gain does not match the loss caused by the responsive material, the gain is adjusted at block 806. The gain may be adjusted, as discussed above, by changing the power of tunable laser source 702 or by adjusting the pump current depending on the type of gain material used. The process then continues at block 804 determining again if the gain matches the loss. If it is determined at block 804 that the gain matches the loss, the initialization process is complete.

In the detection portion 809 of operation flow diagram 800, resonant frequencies at the laser light output 711 are monitored at block 810. In one example this is done by the controller 714 using sensor information provided one or more sensors 712 over the range of frequencies provided in the microwave field engaging the responsive material. In one example the one or more sensors 712 includes a photodiode sensor. Based on the sensor information, the controller 714 determines resonant frequencies in output laser light.

At block 812, it is determined if a split resonant frequency is detected. If a split resonant frequency is not detected at block 812, the process continues at block 810 monitoring for resonant frequencies at block 810. If a split resonant frequency is detected at block 812, a magnitude of the splitting between frequencies is determined at block 814. In one example, this is done with the controller 714 determining the distance between detected resonant frequencies. The strength of the magnetic field is then determined at block 816. The strength of the magnetic field is determined based on the magnitude of the splitting and the frequency and amplitude of the applied microwave. In one example, a relationship between magnitude of frequency splitting and associated magnetic field strength is known based on the known components of the magnetometer 700 with responsive material. The controller 714 applies the relationship in determining the strength of the magnetic field. Further in an example, strengths of magnetic fields are associated with magnitudes of resonance frequency splittings which are stored in memory 716. The controller 714 then looks up the strength of the magnetic field associated with the detected magnitude of the splitting. The process then continues at block 810 monitoring resonant frequencies.

In one example, an initialization portion occurs before each detection portion 809. In another example the initialization portion is only needs to be done once to get the magnetometer 700 with responsive material initially calibrated for magnetic field detection. In another example, the initialization portion is applied periodically to recalibrate calibrate the magnetometer 700 with responsive material as needed.

Figure 9:
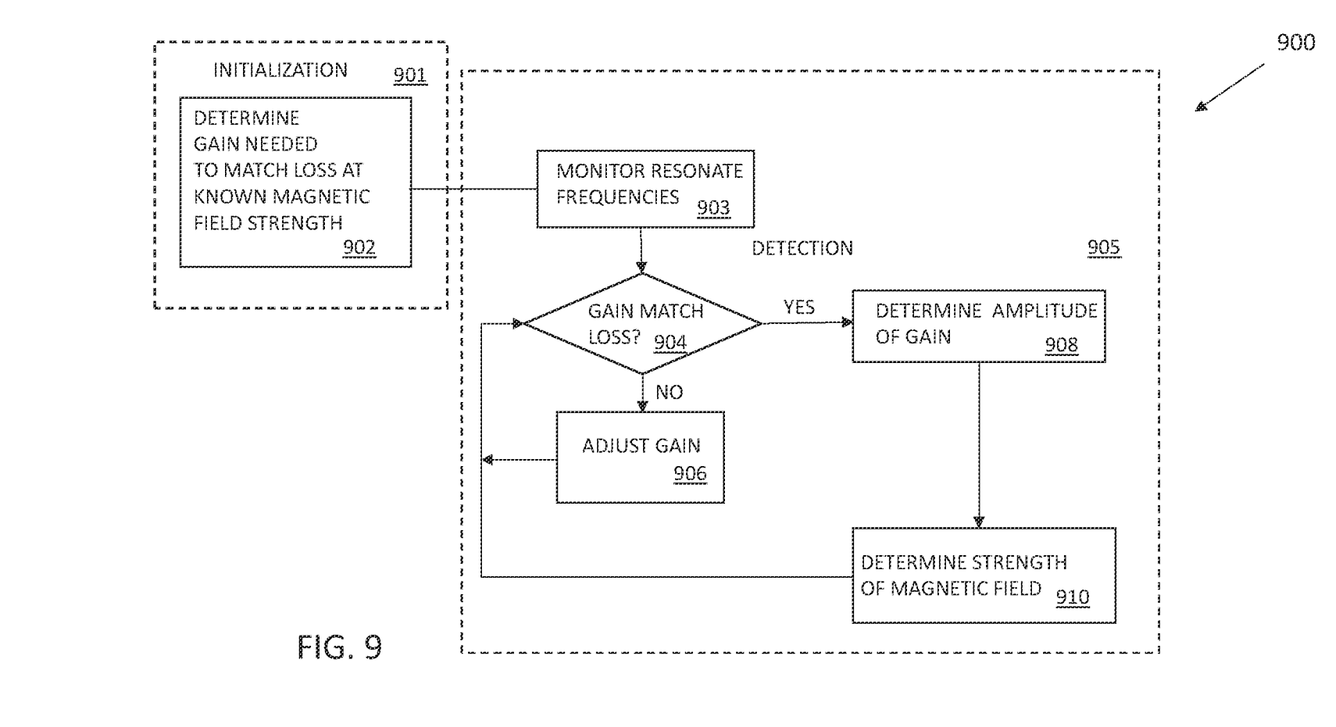
FIG. 9 is another operation flow diagram of a magnetometer with responsive material according to an example aspect of the present invention.

Another example of an operation flow diagram 900 for operating a magnetometer 700 with responsive material is provided in FIG. 9. FIG. 9 is also provided as a series of sequential blocks. The sequence of blocks may occur in a different order or even in parallel in other embodiments. Hence the invention is not limited to the sequential sequence of block set out in FIG. 9.

In the operation flow diagram 900, an amplitude of the gain is used to determine the strength of magnetic field. In the example of FIG. 9, operation flow diagram 900 may also include an initialization portion 901 and a detection portion 905. In the initialization portion 901, the gain needed to match the loss provided by the responsive material at a known magnetic field strength is determined at block 902. This provides a correlation or relationship between the amplitude of the gain and a magnetic field strength. In one example, the gain amplitude associate for a plurality of magnetic field strengths is determined in the initialization portion 901 to provide an increased accuracy in correlation between gain amplitude and magnetic field strength.

The detection portion 905 of the operation flow diagram 900 starts at block 903 monitoring for resonant frequencies at the output of the ring resonator assembly 704. At block 904 it is determined if the gain matches the loss. If it is determined the gain does not match the loss at block 904, the gain is adjusted at block 906 and the process continues at block 904 determining the if the gain matches the loss. In one example this is done by determining if one resonant frequency is observed at the laser light output 711 from the ring resonator assembly 704 of the magnetometer 700.

If it is determined at block 904 that the gain matches the loss, the amplitude of the gain is determined at block 908. The strength of the magnetic field is then determined at block 910 based on the amplitude of the gain needed to match the loss. The process then continues at block 904 determining if the gain matches the loss to determine if the magnetic field strength has changed. As discussed above, in embodiments, the magnetometer system is carefully adjusted so that the coupling efficiency matches the difference between gain and loss. In that case, the system is at an exceptional point at which the two resonance peaks of the system collapse into one. Any small external force such a magnetic field will break the gain/loss balance and split the resonance peaks. Such a system is extremely sensitive to gain/loss perturbation.

Figure 10:
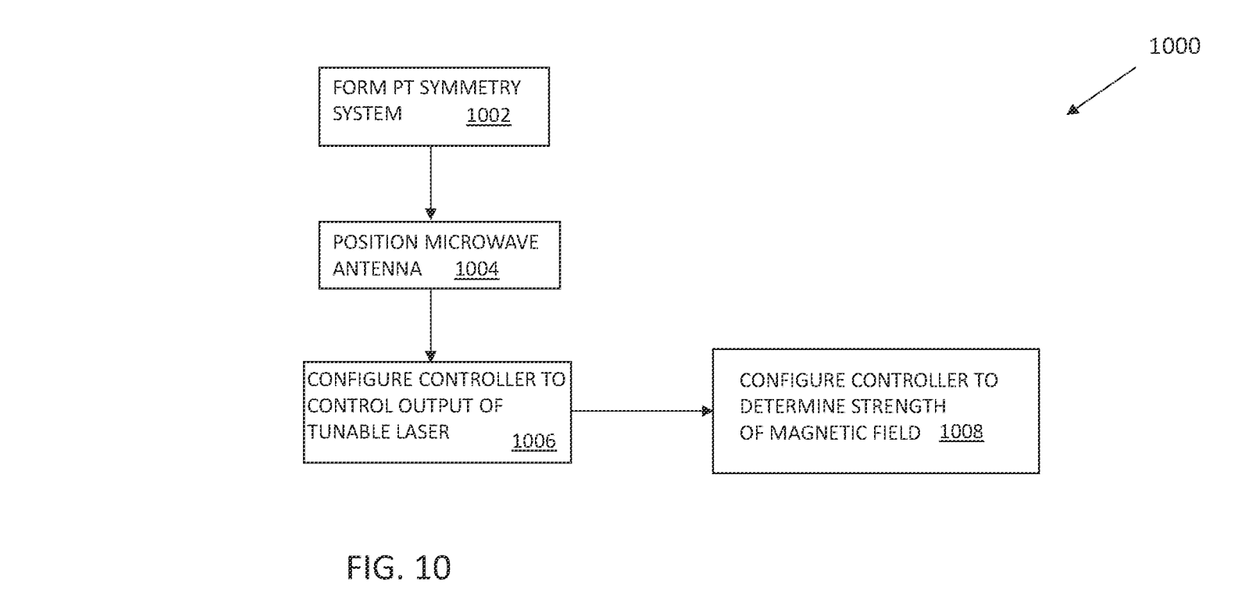
FIG. 10 illustrates a magnetometer with responsive material formation flow diagram according to an example aspect of the present invention.

A magnetometer with responsive material formation flow diagram 1000 of an example is illustrated in FIG. 10. FIG. 10 is provided as a series of sequential blocks. The sequence of blocks may occur in a different order or even in parallel in other embodiments. Hence the invention is not limited to the sequential sequence of block set out in FIG. 10.

The responsive material formation flow diagram 1000 in this example starts at block 1002 forming a PT symmetric assembly. The PT symmetric assembly includes a first portion that amplifies light wave energy received from a tunable laser source with gain material and a second portion of the that dissipates the light wave energy with responsive material. The responsive material is configured to shift a resonance frequency of point defects in response to a magnetic field. In one example, the PT symmetric assembly is a ring resonator assembly with a single or double ring. Further in an example the responsive material is NV diamond material.

A microwave antenna that generates a varying microwave field is positioned so the microwave field engages the responsive material of the PT symmetric assembly at block 1004. The microwave field configured to increase a population of the point defects in the responsive material allowing the responsive material to absorb at least some energy at the shifted resonant frequency.

A controller, such as controller 714 discussed above, is configured to control an output of the tunable laser source to match the gain provided by the gain material with a loss provided by the responsive material at block 1006. As discussed above, when the gain provided by the gain material matched the loss provided by the responsive material an exceptional point is reached where the sensitivity to an external force, a magnetic force in this example, is the highest.

At block 1008, the controller is configured to determine the strength of the magnetic field based on a deviation from an exceptional point evidenced by a resonant frequency split in an output of the PT symmetric assembly. In one example this may be accomplished by determining an magnitude of the splitting between resonant frequencies detected in the output of the ring resonator assembly and determining a strength of the magnetic field associated with the determined magnitude of the splitting between the detected resonant frequencies. In another example, the controller is configured to determine an amount of power provided by the tunable laser source needed to achieve the gain matching the loss and to select a strength of the magnetic field associated with the determined amount of the power by the tunable laser source needed to achieve condition wherein the gain matches the loss.

EXAMPLE EMBODIMENTS

Example 1 is a magnetometer with responsive material. The magnetometer includes a tunable laser source, PT symmetric assembly, at least one sensor, a microwave generator, a microwave antenna, and a controller. The PT symmetric assembly in communication with an output of the tunable laser source, the PT symmetric assembly including gain material and responsive material positioned to achieve PT symmetry. The responsive material is configured to shift a resonance frequency of point defects in response to a magnetic field. The at least one sensor is configured generate sensor information. The at least one sensor is in communication with an output of the PT symmetric assembly. The microwave signal generator is configured to generate microwave signals of varying frequencies. The microwave antenna is configured to generate a microwave field that engages the responsive material. The microwave field increases population of the point defects in the state which allows the responsive material to absorb at least at least some energy at the shifted resonant frequency. The controller is in communication with the at least one sensor and the tunable laser. The controller is configured to adjust the laser source based on the sensor information to cause a gain generated by the gain material to match a loss caused by the responsive material to reach an exceptional point. The controller is further configured to determine a strength of the magnetic field by determining one of a deviation from the exceptional point and an amplitude of the gain needed to reach the exceptional point.

Example 2 includes the magnetometer of Example 1, wherein the PT symmetric assembly is a ring resonator assembly that includes a double ring configuration with the gain material placed in a first ring and the responsive material placed in a second ring to achieve a PT symmetric ring resonator assembly.

Example 3 includes the magnetometer of Example 1, wherein the PT symmetric assembly is a ring resonator assembly that includes a double ring configuration with the gain material placed in a first ring and the responsive material placed in a second ring to achieve a PT symmetric ring resonator assembly to achieve a PT symmetric ring resonator assembly.

the ring resonator assembly includes a single ring configuration with the gain material placed on a first side of the single ring and the responsive material placed on a second side of the single ring configuration.

Example 4 includes the magnetometer of any of the Examples 1-3, further including a memory in communication with the controller to store at least operating instructions implemented by the controller.

Example 5 includes the magnetometer of any of the Examples 1-4, wherein the controller is configured to determine a deviation from the exceptional point by identifying a magnitude of resonant frequency splitting based on the sensor information from the at least one sensor.

Example 6 includes the magnetometer of any of the Examples 1-5, wherein the controller is configured to identify the exceptional point when only one resonant frequency is detected from the sensor information from the at least one sensor.

Example 7 includes the magnetometer of any of the Examples 1-6, further including at least one mirror that is configured to direct laser light through the PT symmetric assembly.

Example 8 includes the magnetometer of any of the Examples 1-7, wherein the tunable laser source further includes a pump laser and a probe laser. The pump laser generating pump light that is communicated to the output of the tunable laser source. The probe laser generating probe light that is communicated to the output of the tunable laser source.

Example includes the magnetometer of Example 8, wherein the responsive material is nitrogen-vacancy (NV) diamond material and further wherein the pump light has a wavelength of 532 nm and the probe light has a wavelength of 1042 nm.

Example 10 includes a method of operating a magnetometer with responsive material. The method includes monitoring resonant frequencies in an output of a ring resonator assembly of the magnetometer, the ring resonator assembly including gain material and the responsive material that are positioned to achieve a parity-time symmetric ring resonator assembly, the responsive material being configured to shift a resonance frequency of point defects in response to a magnetic field; determining if a gain provided by gain material matches a loss caused by the responsive material based on the monitored resonant frequencies; and determining a strength of a magnetic field when the gain provided by the gain material does not match a loss provided by the responsive material.

Example 11 includes the method of Example 10, further including initializing the magnetometer by adjusting the gain to match the loss caused by the responsive material to reach an exceptional point in the absence of a microwave field.

Example 12 includes the method of any of the Examples 10-11 wherein adjusting the gain further includes adjusting one of a power of a tunable laser source and adjusting a current of the tunable laser source.

Example 13 includes the method of any of the Examples 10-12, wherein monitoring resonant frequencies in an output of a ring resonator assembly further includes comparing power levels at different frequencies in the output of the ring resonator assembly.

Example 14 includes the method of any of the Examples 10-13, further including engaging the responsive material with a microwave field to increase a population of the point defects in a state which allows the responsive material to absorb at least some energy at the shifted resonant frequency.

Example 15 includes the method of any of the Examples 10-14, wherein determining a strength of a magnetic field further includes determining an magnitude of a splitting between resonant frequencies detected in the output of the ring resonator assembly; and determining a strength of the magnetic field associated with the determined magnitude of the splitting between the detected resonant frequencies.

Exampled 16 includes the method of any of the Examples 10-14, wherein determining a strength of a magnetic field further includes determining an amount of power provided by a tunable laser source needed to achieve the condition in which the gain matches the loss; and selecting a strength of the magnetic field associated with the determined amount of the power by the tunable laser source needed to achieve the condition in which the gain matches the loss.

Example 17 includes a method of creating a magnetometer with responsive material. The method including forming a parity-time (PT) symmetry assembly where a first portion of the PT symmetric assembly is configured to amplify light wave energy received from a tunable laser source with gain material and a second portion of the PT symmetric assembly is configured to dissipate the light wave energy with responsive material, wherein the responsive material configured to shift a resonance frequency of point defects in response to a magnetic field; positioning a microwave antenna that is configured to generate a microwave field to engage the responsive material, the microwave field increasing a population of the point defects in the responsive material in a state which allows the responsive material to absorb at least some energy at the shifted resonant frequency; configuring a controller to control an output of the tunable laser source to match the gain provided by the gain material with a loss provided by the responsive material; and configuring the controller to determine a strength of a magnetic field based on a resonant frequency splitting in an output of the parity-time symmetric assembly.

Example 18 includes the method of Example 17, wherein the PT symmetric assembly is a ring resonator assembly.

Example 19 includes the method of any of the Examples 17-18 wherein configuring the controller to determine a strength of a magnetic field based on a resonant frequency splitting in an output of the PT symmetric assembly further includes configuring the controller to determine an magnitude of a splitting between resonant frequencies detected in the output of the PT symmetric assembly; and configuring the controller to determine a strength of the magnetic field associated with the determined magnitude of the splitting between the detected resonant frequencies.

Example 20 includes the method of any of the Examples 17-18, wherein configuring the controller to determine the strength of the magnetic field based on the resonant frequency splitting in the output of the PT symmetric assembly further includes configuring the controller to determine an amount of power provided by the tunable laser source needed to achieve the condition in which the gain matches the loss; and configuring the controller to select a strength of the magnetic field associated with the determined amount of the power by the tunable laser source needed to achieve the condition in which the gain matches the loss.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A magnetometer with responsive material, the magnetometer comprising:
   a tunable laser source;
   a parity-time (PT) symmetric assembly in communication with an output of the tunable laser source, the PT symmetric assembly including gain material and responsive material positioned to achieve PT symmetry, the responsive material configured to shift a resonance frequency of point defects in response to a magnetic field;

at least one sensor configured to generate sensor information, the at least one sensor in communication with an output of the PT symmetric assembly;

a microwave signal generator configured to generate microwave signals of varying frequencies;

a microwave antenna configured to generate the microwave field that engages the responsive material, the microwave field increasing population of the point defects in a state which allows the responsive material to absorb at least at least some energy at the shifted resonant frequency; and a controller in communication with the at least one sensor and the tunable laser, the controller configured to adjust the tunable laser source based on the sensor information to cause a gain generated by the gain material to match a loss caused by the responsive material to reach an exceptional point, the controller further configured to determine a strength of the magnetic field by determining one of a deviation from the exceptional point and an amplitude of the gain needed to reach the exceptional point.

2. The magnetometer of claim 1, wherein the PT symmetric assembly is a ring resonator assembly that includes a double ring configuration with the gain material placed in a first ring and the responsive material placed in a second ring to achieve a PT symmetric ring resonator assembly.

3. The magnetometer of claim 1, wherein the PT symmetric assembly is a ring resonator assembly that includes a single ring configuration with the gain material placed on a first side of a single ring and the responsive material placed on a second side of the single ring to achieve a PT symmetric ring resonator assembly.

4. The magnetometer of claim 1, further comprising:
a memory in communication with the controller to store at least operating instructions implemented by the controller.

5. The magnetometer of claim 1, wherein the controller is configured to determine a deviation from the exceptional point by identifying a magnitude of a resonant frequency splitting based on the sensor information from the at least one sensor.

6. The magnetometer of claim 1, wherein the controller is configured to identify the exceptional point when only one resonant frequency is detected from the sensor information from the at least one sensor.

7. The magnetometer of claim 1, further comprising:
at least one mirror configured to direct laser light through the PT symmetric assembly.

8. The magnetometer of claim 1, wherein the tunable laser source further comprises:
a pump laser to generate pump light communicated to the output of the tunable laser source; and
a probe laser to generate probe light communicated to the output of the tunable laser source.

9. The magnetometer of claim 8, wherein the responsive material is nitrogen-vacancy (NV) diamond material, further wherein:
the pump light has a wavelength of 532 nm; and
the probe light has a wavelength of 1042 nm.

10. A method of operating a magnetometer with responsive material comprising:
monitoring resonant frequencies in an output of a ring resonator assembly of the magnetometer, the ring resonator assembly including gain material and the responsive material that are positioned to achieve a parity-time symmetric ring resonator assembly, the responsive material being configured to shift a resonance frequency of point defects in response to a magnetic field;
determining if a gain provided by the gain material matches a loss caused by the responsive material based on the monitored resonant frequencies; and
determining a strength of the magnetic field when the gain provided by the gain material does not match a loss provided by the responsive material.

11. The method of claim 10, further comprising:
initializing the magnetometer by adjusting the gain to match the loss caused by the responsive material to reach an exceptional point in the absence of a microwave field.

12. The method of claim 11, wherein adjusting the gain further comprises:
adjusting one of a power of a tunable laser source and adjusting a current of the tunable laser source.

13. The method of claim 10, wherein monitoring the resonant frequencies in the output of the ring resonator assembly further comprises:
comparing power levels at different frequencies in the output of the ring resonator assembly.

14. The method of claim 10, further comprising:
engaging the responsive material with a microwave field to increase a population of the point defects in a state which allows the responsive material to absorb at least some energy at the shifted resonant frequency.

15. The method of claim 10, wherein determining the strength of the magnetic field further comprises:
determining a magnitude of a splitting between resonant frequencies detected in the output of the ring resonator assembly; and
determining a strength of the magnetic field associated with the determined magnitude of the splitting between the detected resonant frequencies.

16. The method of claim 10, wherein determining the strength of the magnetic field further comprises:
determining an amount of power provided by a tunable laser source needed to achieve the condition in which the gain matches the loss; and
selecting a strength of the magnetic field associated with the determined amount of the power by the tunable laser source needed to achieve the condition in which the gain matches the loss.

17. A method of creating a magnetometer with responsive material comprising:
forming a parity-time (PT) symmetric assembly where a first portion of the PT symmetric assembly is configured to amplify light wave energy received from a tunable laser source with gain material and a second portion of the PT symmetric assembly is configured to dissipate the light wave energy with responsive material, wherein the responsive material is configured to shift a resonance frequency of point defects in response to a magnetic field;
positioning a microwave antenna that that is configured to generate the microwave field to engage the responsive material, the microwave field increasing a population of the point defects in the responsive material in a state which allows the responsive material to absorb at least some energy at the shifted resonant frequency;
configuring a controller to control an output of the tunable laser source to match the gain provided by the gain material with a loss provided by the responsive material; and configuring the controller to determine a strength of a magnetic field based on a resonant frequency splitting in an output of the PT symmetric assembly.

18. The method of claim 17, wherein the PT symmetric assembly is a ring resonator assembly.

19. The method of claim 17, wherein configuring the controller to determine the strength of the magnetic field based on the resonant frequency splitting in the output of the PT symmetric assembly further comprises:

configuring the controller to determine a magnitude of a splitting between resonant frequencies detected in the output of the PT symmetric assembly; and configuring the controller to determine a strength of the magnetic field associated with the determined magnitude of the splitting between the detected resonant frequencies.

20. The method of claim 17, wherein configuring the controller to determine the strength of the magnetic field based on the resonant frequency splitting in the output of the PT symmetric assembly further comprises:

configuring the controller to determine an amount of power provided by the tunable laser source needed to achieve the condition in which the gain matches the loss; and configuring the controller to select a strength of the magnetic field associated with the determined amount of the power by the tunable laser source needed to achieve the condition in which the gain matches the loss.

\* \* \* \* \*